United States Patent [19]

Munoz

[11] Patent Number: 5,651,740

[45] Date of Patent: Jul. 29, 1997

[54] FOAMED CORE PRODUCTS AND METHOD

[76] Inventor: John A. Munoz, 45 Ladue Estates Dr., St. Louis, Mo. 63141

[21] Appl. No.: 703,336

[22] Filed: Aug. 26, 1996

Related U.S. Application Data

[63] Continuation of Ser. No. 328,008, Oct. 24, 1994, abandoned.

[51] Int. Cl.⁶ .................................................. A63B 59/06
[52] U.S. Cl. .................... 473/118; 473/120; 473/564; 264/41; 264/328.16; 264/DIG. 13; 264/DIG. 77; 249/111
[58] Field of Search ........................... 473/118, 119, 473/120, 564, 567; 273/67 R, 72 R, 72 A, DIG. 8; 264/41, 45.1, 45.5, 328.16, DIG. 13, DIG. 46, DIG. 77; 249/78, 79, 111

[56] References Cited

U.S. PATENT DOCUMENTS

| | | | |
|---|---|---|---|
| 2,804,399 | 8/1957 | Kelly et al. | 473/119 |
| 3,240,646 | 3/1966 | Smith | 473/119 |
| 3,265,401 | 8/1966 | Spier | 473/118 |
| 3,478,134 | 11/1969 | Gruss et al. | 473/119 |
| 4,340,226 | 7/1982 | Haines | 473/118 |
| 4,548,773 | 10/1985 | Suh et al. | 264/328.16 |
| 4,746,117 | 5/1988 | Noble et al. | 273/DIG. 8 |
| 4,848,745 | 7/1989 | Bohannan et al. | 273/67 R |
| 5,185,914 | 2/1993 | Petruccelli et al. | 264/328.16 |
| 5,266,259 | 11/1993 | Harrison et al. | 264/328.16 |
| 5,354,239 | 10/1994 | Mueller . | |

OTHER PUBLICATIONS

Article from the Modern Plastics Mid–October Encyclopedia Issue entitled Fibrous Reinforcements pp. 237–246.
Article from the Design Guide for Advanced Composites Application entitled Designing Structural Tubes pp. 40–41.

*Primary Examiner*—William M. Pierce
*Attorney, Agent, or Firm*—Polster, Lieder, Woodruff & Lucchesi, L.C.

[57] ABSTRACT

An elongated member, for example, a bowling pin, has a core of foamed plastic material, which has areas of greater density, generally toward the lower end of the bowling pin, so as to provide desired weight distribution along the member. In the bowling pin, providing a denser core area near the bottom lowers the center of gravity. In a baseball bat, the increased density can be provided in the "sweet spot" area, if desired.

In producing the variation in density, the mold in which the foamed core is formed is heated in those areas in which the density is to be light and chilled in those areas in which the density is to be increased.

In making a baseball or softball bat, a foamed core can be wrapped directly with graphite filament or graphite and glass filaments, or synthetic fibers such as Aramid fibers of the type marketed by Dupont de Nemours as KEVLAR® either dry wrapped and subsequently embedded in epoxy or the like, or wrapped with adhesive coated fiber that is then cured.

13 Claims, 2 Drawing Sheets

FOAMED CORE PRODUCTS AND METHOD

This is a continuation application of application Ser. No. 08/328,008, filed on Oct. 24, 1994, now abandoned.

Bowling pins have been made by molding a blown or foamed polyurethane core and then molding a polyurethane elastomeric shell around the core. The core has been made by pouring a liquid mixture of polyol material and isocyanate material that react in the presence of water or blowing agents such as methylene chloride, or fluorocarbons to expand into a cellular mass and curing it to a solid. The mold is kept at a uniform temperature, usually in the range of 80° F. to 120° F., and the resulting core has a substantially uniform density at each increment of its length. The weight and center of gravity have been controlled by the amount and distribution of the polyurethane elastomer that is cast around the core. The manufacturers of plastic bowling pins have found it difficult to meet the American Bowling Congress specifications for weight and center of gravity.

Some baseball bats have been made by winding on a mandrel, graphite or glass filaments, or both, obtaining the desired weight distribution by increasing the thickness of the bat wall where additional weight was desired.

One of the objects of this invention is to provide a foamed core and method of making it, in which the density of the foam is varied along the length of the member.

Other objects will be become apparent to those skilled in the art in the light of the following description and accompanying drawing.

SUMMARY OF THE INVENTION

In accordance with this invention, generally stated, an elongated member is provided with a core of foamed or blown plastic that is of variable density at least one selected area along its length. In a plastic bowling pin, for example, the lower end of the core can be made more dense, to lower the center of gravity of the pin. In a baseball or softball bat, the density of a foamed or blown plastic core can be made greater through the area of the "sweet spot." In the case of a baseball or softball bat, carbon (graphite) or glass filaments, or both, may be wound or braided directly on a blown core.

In the method of the preferred embodiment, the core is cast in a mold which is heated in those parts that are to be relatively porous, and chilled in those areas in which the density of the core is to be made greater.

IN THE DRAWING

DESCRIPTION OF THE PREFERRED EMBODIMENT

Figure 1:
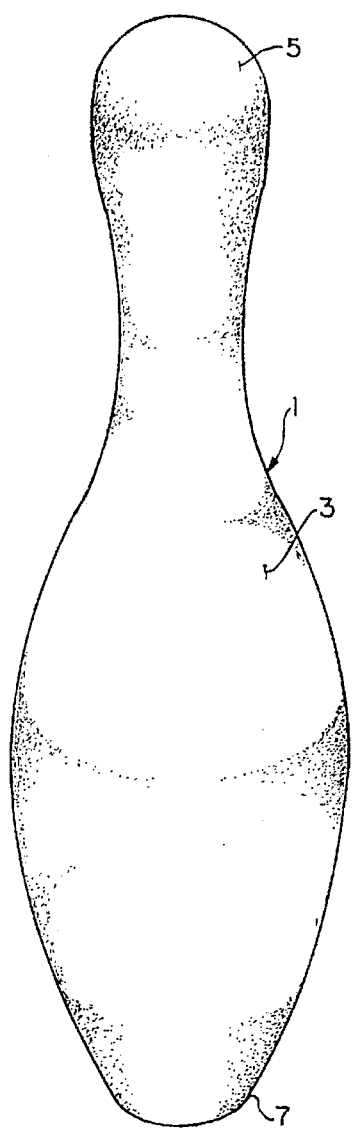
FIG. 1 is a view in perspective of a bowling pin made in accordance with one embodiment of this invention.
Figure 2:
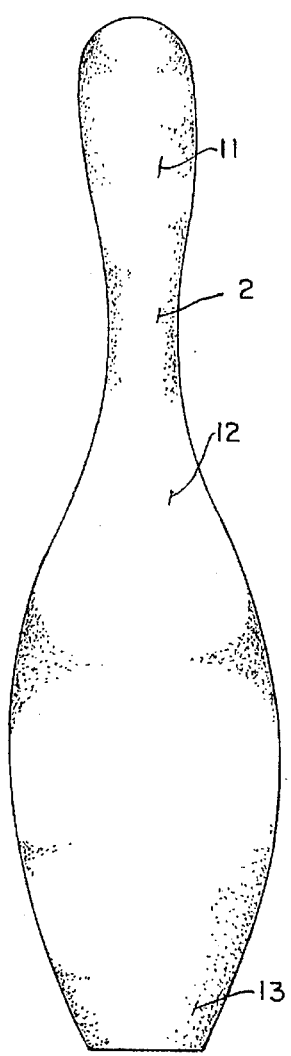
FIG. 2 is a view in side elevation of a blown core of the bowling pin of FIG. 1.
Figure 3:
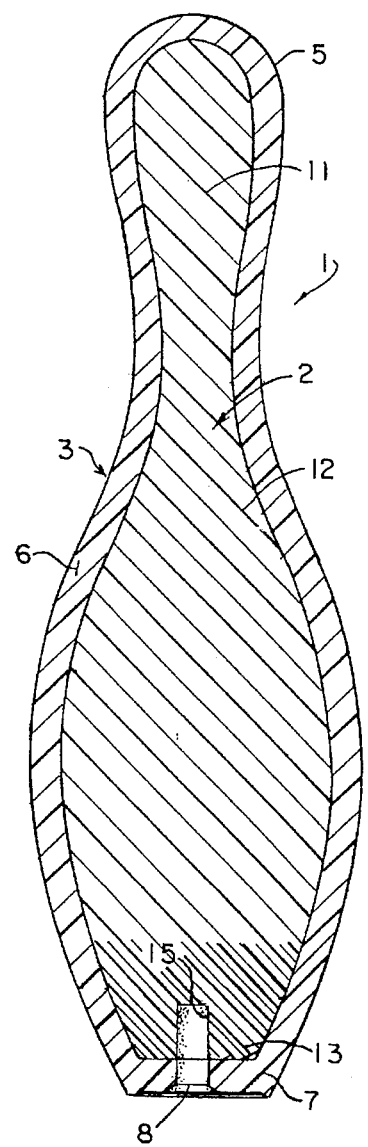
FIG. 3 is a longitudinal cross-sectional view of the bowling pin of FIG. 1.
Figure 4:
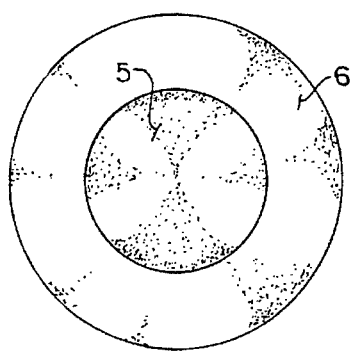
FIG. 4 is a top plan view of the bowling pin shown in FIG. 4.
Figure 5:
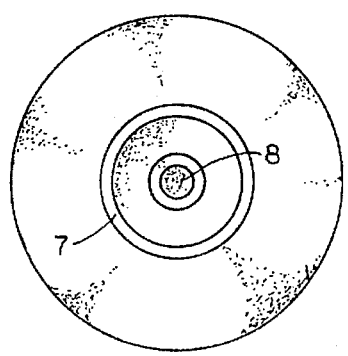
FIG. 5 is a bottom plan view of the bowling pin shown in FIG. 1.

Referring now to FIGS. 1 through 6 for one illustrative embodiment of member of this invention, reference numeral 1 indicates a completed plastic bowling pin, made up of a core 2 of blown or foamed plastic, and a shell 3 of a dense plastic, bonded to the core 2. The bowling pin, hence the shell, has a top part 5, a side wall 6, and a base 7. A locating pin passage 8 is centered in a circular flat surface of the base 7.

The core 2 has an upper section 11, an intermediate section 12, and a lower section 13. A locating pin cavity 15 is centered in the lower section 13, extends axially upwardly into the section, and opens through a lower surface of the bottom section 13.

The upper section 11 and intermediate section 12 of the core may be made with different densities, but both are substantially less dense than the lower section 13.

Figure 6:
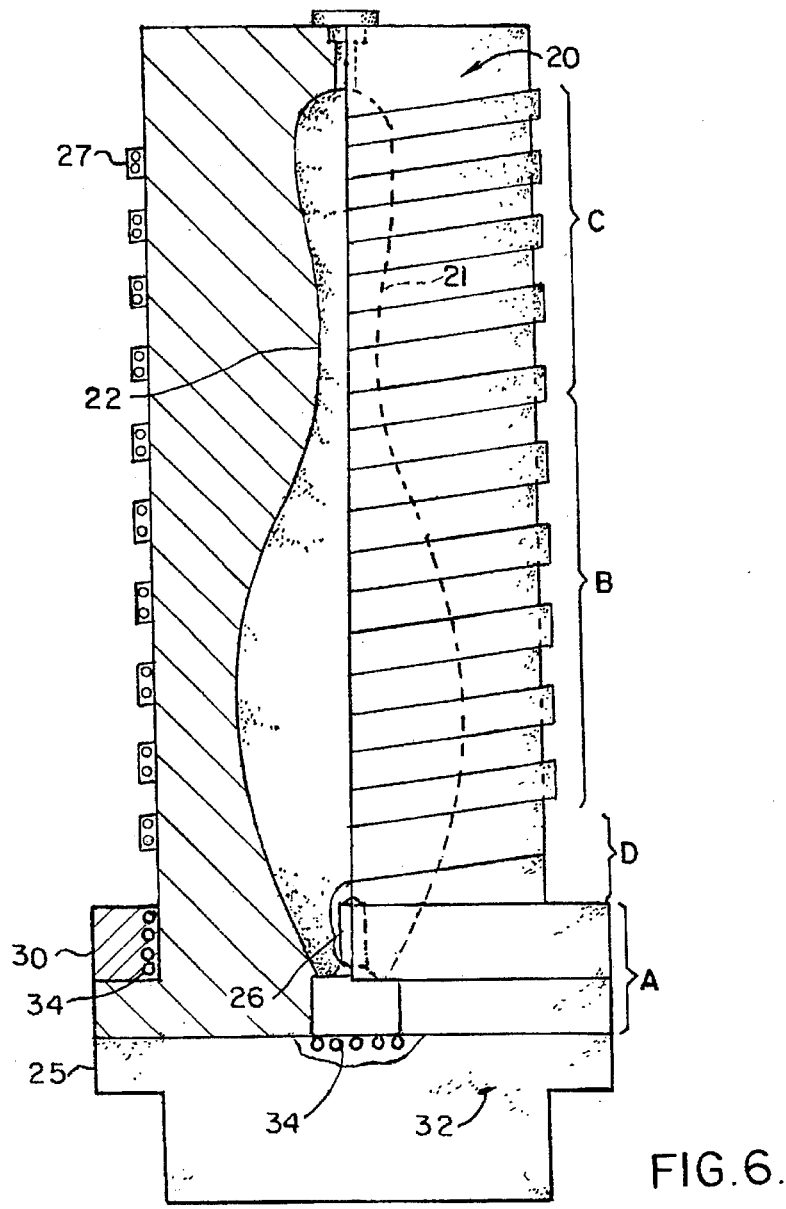
FIG. 6 is a view, partly in section, of a mold for a core.

Referring now to FIG. 6 for a somewhat schematic illustration of a mold by which the core 2 can be made, reference numeral 20 indicaies the entire mold. The mold 20 is made up of two parts 21 and 22, and a base closure plate 25, as is conventional. The base closure plate 25 has a locating cavity pin 26 projecting perpendicularly from it, to create the cavity 15 in the core. In this embodiment, there are four temperature zones for the mold, indicated as A, B, C and D. Heating elements 27 or their equivalent, are used to heat zones B and C. Zone D, a buffer zone, is neither directly heated nor cooled. Zone A, and the base closure plate 25 are cooled in any suitable way, cooling coils 34 being shown by way of illustration.

Merely by way of illustration, zone C is heated to approximately 86° F.; zone B, to approximately 90° F.; zone A is chilled to 32° F., and the closure plate, to 28° F. A polyurethane system (polyoMsocyanate mixture, with a blowing agent) is poured into the mold from the top in the quantity required to make the core. The heat of reaction of the polyurethane system raises the temperature in zone C to approximately 94° F., that of the zone B to 105° F., and in zone A, to 50° F.. The core is permitted to cure at those temperatures. Under those circumstances, the density of the polyurethane core near (e.g. 1 inch from) the bottom surface is 34.90 pounds per cubic foot and at 2 inches from the bottom, 25.58 pounds per cubic foot. The density in the center of zone B (the intermediate section 12 of the core) is 18.69 pounds per cubic foot. The density in the lower portion of the upper section 11 (zone C of the mold), is 18.08 pounds per cubic foot, and near the lower portion of the section 11, 18.69 pounds per cubic foot. The overall density is 20.57 pounds per cubic foot.

The effect of the increasing density at the bottom of the core is to lower the center of gravity of the pin from what it would have been if the density of the core were uniform from top to bottom. The density gradient can be made greater or less, by varying the temperatures of the various zones.

A heavy, unblown polyurethane elastomer shell is molded around the core 2, and bonded to it. The materials and techniques for this shell molding step are known and form no part of this invention.

Figure 7:
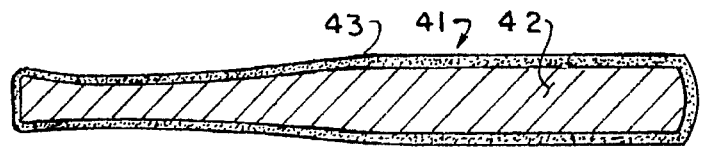
FIG. 7 is a sectional view of a softball bat made in accordance with one embodiment of this invention.
Figure 8:
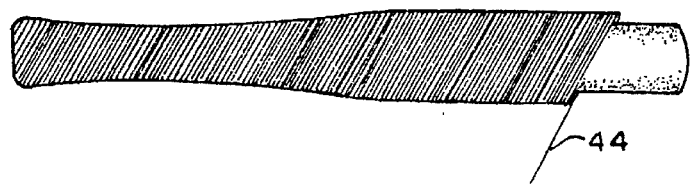
FIG. 8 is a longitudinal cross-sectional view of a core of the bat shown in FIG. 7, in the process of being wound with graphite filament.

Referring now to FIGS. 7 and 8 for another embodiment of this invention, reference numeral 41 indicates a softball bat, with a core 42 and a shell 43. The core 42 can be made with varying density along its length, just as the core 2 of the bowling pin 1, although the area to be densifted will preferably be intermediate the ends of the core, rather than at one end, depending upon how the bat is to be balanced.

A difference between the bat shown in FIG. 7 and that of the bowling pin lies in the composition of the shell 43 which, in the bat of the embodiment shown, is made up of graphite or glass filament, or both, wound or braided directly upon the core 42. The filament can be dry wound and resin-transfer molded with epoxy, or polyurethane resin, or the core can be precoated with adhesive and filament wound. The precoating can be accomplished by dipping, spraying or brushing precoating techniques being well-known.

Numerous variations in the members and method of making them will become apparent to those skilled in the art in the light of the foregoing disclosure. For example, other articles, different from ball bats and bowling pins, in which a low center of gravity, or a distribution of weight along or within the object can be made by this method. Different temperature differentials can be used for the purposes of obtaining differential densities at a desired place. For example, if it is desired to make the intermediate zone 12 more dense, the part B of the mold can be heated less, or even cooled. In the case of the baseball bat, it is possible to make the bat heavier in the handle section, or at the outer end. Other methods of heating or cooling the mold can be used, as by immersing the lower end of the mold in a liquified gas, or resting it on dry ice. These are merely illustrative.

I claim:

1. A method of making an elongated member with a one-piece, uninterrupted core, comprising providing an elongated hollow mold, chilling a first portion of said mold to a temperature below that at which a selected intumescent material foams to substantially prevent foaming of said intumescent material in said first portion of said mold, maintaining the temperature of a second portion of said mold at a temperature at which said intumescent material foams, said portions being spaced longitudinally of said mold from one another, introducing said selected intumescent material into said hollow mold, causing said intumescent material to foam in said second portion but not in said first portion, and curing said intumescent material such that resulting core has a density which varies axially along the core from that of a non-porous material to that of a porous material.

2. The method of claim 1 including the step of heating an intermediate third portion of said mold contiguous the first portion that is chilled, to a temperature intermediate the temperature of the chilled first portion and the temperature of the second portion.

3. The method of claim 2 wherein the elongated member is a bowling pin, the chilled first portion of the mold has a temperature on the order of 32° F., the intermediate third portion contiguous the chilled portion is heated to the order of 86° F. and the second portion of the mold remote from said chilled first portion and contiguous said intermediate third portion is heated to the order of 90° F., said intumescent material is polyurethane and a blowing agent, the temperatures of the said portions rising with the heat of reaction of the polyurethane to the order of 50° F. in the chilled first portion, 94° F. in the intermediate third portion and 105° F. in the remote second portion.

4. The method of claim 1 wherein the elongated member is a bowling pin, and the chilled portion of the mold produces the bototm portion of the core.

5. The method of claim 4 wherein the part of the mold in which the bottom portion of the bowling pin is formed is chilled to a temperature on the order of 32° F.

6. The method of claim 1 including the steps of forming a shell of dense material around the core after the core is made.

7. The method of claim 1 including the step of wrapping the said core means by braiding or winding filament directly on said core.

8. The method of claim 7 wherein the filament is taken from the group consisting of graphite, glass, and aramid plastics.

9. the method of claim 7 wherein the filament is dry when wound, and the wound core is resin-transfer molded with a material taken from the group consisting of epoxy resin and urethane.

10. The method of claim 7 wherein the core is precoated with adhesive before it is wound or braided.

11. An elongated member with unitary core, the core having a density which varies axially, the member being formed on an intumescent material in a mold by;

chilling a first portion of said mold to a temperature below that at which the intumescent material foams to substantially prevent foaming of said intumescent material in said portion of said mold, simultaneously maintaining the temperature of a second portion of said mold at a temperature at which said intumescent material foams to allow foaming of said intumescent material in said second portion of said mold, said first and second portions of said mold being spaced longitudinally of said mold from one another;

introducing said intumescent material into said hollow mold, causing said intumescent material to foam in said second portion but not in said first portion, and curing said intrumescent material.

12. The elongated member of claim 11 in the form of a baseball bat having a handle and a ball-striking zone, said bat core having an area of increased density in a ball-striking zone.

13. The elongated member of claim 11 in the form of a bowling pin having a base section and a top section, said pin core having an area of increased density of a base section.

* * * * *